United States Patent

[11] 3,588,541

[72] Inventors Joseph Y. Chan
 Chelmsford;
 Dinesh C. Gupta, Cambridge, Mass.
[21] Appl. No. 886,973
[22] Filed Dec. 22, 1969
[45] Patented June 28, 1971
[73] Assignee General Telephone & Electronics
 Laboratories, Incorporated

[54] PULSE-GENERATING APPARATUS
 7 Claims, 1 Drawing Fig.
[52] U.S. Cl. .................................................. 307/252G,
 307/220B, 318/227, 328/75
[51] Int. Cl. ................................................... H03k 21/00,
 H03k 17/00
[50] Field of Search ............................................ 307/252.26,
 220 (B)—225 (B); 315/84.5; 318/227, 345, 221

[56] References Cited
 UNITED STATES PATENTS
3,309,537 3/1967 Archer .......................... 307/223B
3,328,660 6/1967 Dunbar ......................... 318/221R
3,329,834 7/1967 Klinikowski ................. 307/223B Primary Examiner—Donald D. Forrer
Assistant Examiner—David M. Carter
Attorneys—Robert J. Frank and David M. Keay ABSTRACT: Pulse-generating apparatus employing four silicon-controlled switches and four corresponding transistors. The four silicon-controlled switches are coupled to a source of trigger pulses and to each other whereby trigger pulses cause each silicon-controlled switch together with its corresponding transistor to be rendered conductive in sequence, thereby producing a continuous series of output pulses at the collectors of each of the transistors in succession. These output pulses are coupled through an arrangement of transistors and transformers to provide a pair of output signals displaced in phase by 90° to the two sets of windings of a two-phase synchronous electrical motor.

PATENTED JUN28 1971 3,588,541

INVENTORS
JOSEPH Y. CHAN
DINESH C. GUPTA
BY David M. Keay
AGENT 3,588,541

PULSE-GENERATING APPARATUS

BACKGROUND OF THE INVENTION

This invention relates to pulse-generating apparatus. More particularly, it is concerned with circuitry employing semiconductor devices for producing pulses at a plurality of output connections in sequence.

There are many situations requiring apparatus for the generation of electrical pulses. More specifically, for certain application it is necessary to employ pulse-generating apparatus which produces pulses in sequence at a plurality of output terminals. In addition, it may be desirable to be able to vary the frequency of the pulses. One application for pulse-generating apparatus having these capabilities is in circuitry for driving a synchronous electrical motor. A specific requirement for circuitry for driving a synchronous electrical motor at different speeds, each of which is precisely controlled, is described in application Ser. No. (D-721) filed concurrently herewith by Joseph Y. Chan and Dinesh C. Gupta and entitled "Apparatus for Measuring Electrical Characteristics of a Specimen" and assigned to the assignee of the present invention.

SUMMARY OF THE INVENTION

Pulse-generating apparatus in accordance with the invention which is particularly suitable for use in driving a synchronous electrical motor includes a source of trigger pulses for producing a series of trigger pulses. Also included are a plurality of switching devices, which may be four-layer-type semiconductor switching devices known in the art as silicon-controlled switches, arranged in succession. Each of these devices has an anode terminal, a cathode terminal, and a gate electrode adjacent each of the terminals, and operates either in a conducting state or in a nonconducting state.

The apparatus includes a source of reference potential connected through a common resistance means to one of the terminals of each of the switching devices of the plurality. The source of reference potential is capable of switching to the conducting state any of the switching devices which are biased so as to permit switching to the conducting state, and is capable of sustaining the operation of a switching device in the conducting state. The resistance means permits only one switching device at a time to operate in the conducting state. The source of trigger pulses is connected to the one of said terminals of each of the switching devices and switches all the switching devices of the plurality to the nonconducting state during a trigger pulse.

The apparatus also includes a like plurality of transistors arranged in succession with a transistor corresponding to each switching device. Each transistor has an input electrode and an output electrode, and produces an output signal at its output electrode when it is conducting. The other of the terminals of each of the switching devices is connected to the input electrode of its corresponding transistor, and a transistor is biased to conduction when its corresponding switching device is in the conducting state.

Coupling means is connected between the gate electrode adjacent the one terminal of each of the switching devices, except the last switching device in the succession, and the gate electrode adjacent the other terminal of the switching device next following it in the succession. The coupling means operates in response to switching of the preceding switching device from the conducting state to the nonconducting state so as to bias a switching device so as to permit switching of that switching device to the conducting state. A biasing means is connected to the source of trigger pulses and to the gate electrode adjacent the other of said terminals of the first switching device in succession. This biasing means biases the first switching device so as to permit switching of that switching device to the conducting state upon termination of a trigger pulse when none of the other switching devices is biased to permit switching to the conducting state. Thus, each switching device in succession operates in the conducting state thereby causing the transistors associated with them to conduct in succession and produce a continuous series of output signals at the output electrodes of the transistors.

BRIEF DESCRIPTION OF THE DRAWING

Additional objects, features, and advantages of pulse-generating apparatus in accordance with the invention will be apparent from the following detailed discussion together with the accompanying drawing in which the single FIGURE is a schematic circuit diagram of pulse-generating apparatus according to the invention employed in a motor driving circuit for driving a two-phase synchronous electrical motor.

DESCRIPTION OF THE INVENTION

Figure 1:
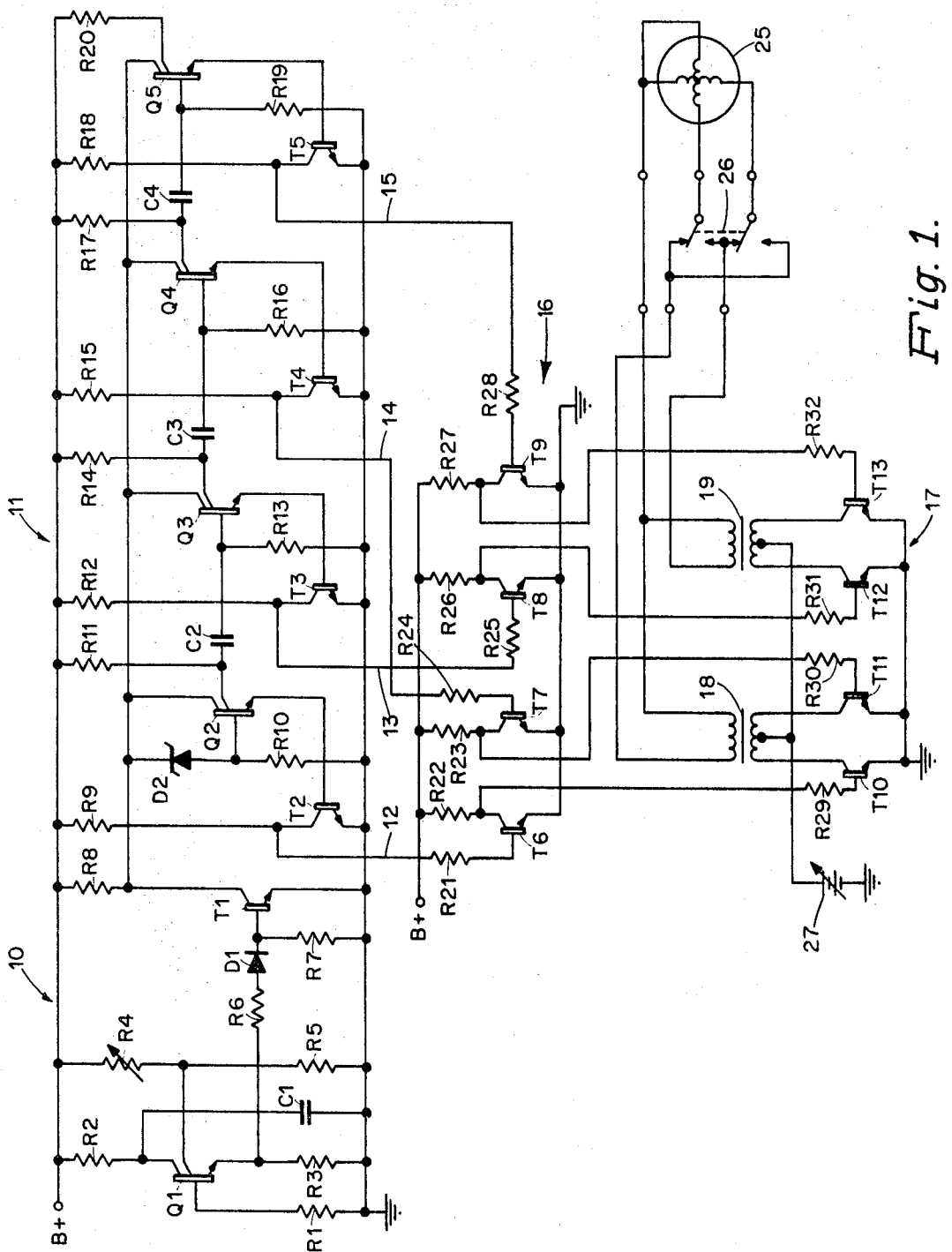

The motor driving circuit illustrated in the single FIGURE of the drawing employs a pulse-generating apparatus in accordance with the invention including an oscillator section 10 which produces a succession of negative-going trigger pulses. These trigger pulses are applied to a distributing section 11 which produces a negative-going signal pulse on each of four output lines 12, 13, 14, and 15 in succession. In effect, each trigger pulse from the oscillator section 10 causes the output signal pulse to be shifted from one output line to the next in succession. The output lines 12, 13, 14, and 15 are connected to separate transistors in an inverting and amplifying section 16. The pulses are then applied to transistors in a driving section 17. In the driving section the pulses are applied across the primary windings of first and second center-tapped transformers 18 and 19. One end of the secondary winding of each transformer is connected together to form a common connection to one end of both sets of windings of a two-phase synchronous motor 25. The other end of the secondary winding of each transformer is connected to the other end of different ones of two sets of motor windings. Thus, alternating currents with a 90° phase angle are applied across the two sets of windings of the motor. The connections between the driving section 17 and the motor windings can be changed by a reversing switch 26 so as to rotate the motor in either direction.

The oscillator section 10 includes a switching device Q1, specifically a four-layer-type semiconductor switch commonly referred to as a silicon-controlled switch. The anode of the switching device Q1 is connected through a resistance R2 to a positive voltage source labeled B+. The anode is also connected through a capacitance C1 to ground. The cathode is connected through a resistance R3 to ground. The gate electrode adjacent the anode, or anode gate, is connected to the juncture of two resistance R4 and R5 which are connected between the B+ voltage source and ground to provide a voltage divider. As illustrated, the resistance R4 may be a potentiometer so as to permit adjusting of the frequency of operation of the oscillator section and thus of the pulse-generating apparatus as will be explained in detail hereinbelow.

The gate electrode adjacent the cathode, or cathode gate, of the switching device Q1 is connected through a resistance R1 to ground. The cathode of the switching device Q1 is also connected through a resistance R6 and a diode D1 to the base of an NPN oscillator section output transistor T1. The base of transistor T1 is also connected through a resistance R7 to ground and its emitter is connected directly to ground. The collector of transistor T1 is connected through a resistance R8 to the B+ voltage source.

The oscillator 10 operates to produce a series of negative-going pulses of short duration at the collector of the output transistor T1. The voltage divider arrangement of R4 and R5 produces a bias on the anode gate of the switching device Q1 which is controlled by the setting of the potentiometer R4. When the potential at the anode of the switching device Q1 is sufficiently high, switching device Q1 switches to the conducting state and heavy current flows from the B+ voltage source to ground through the switching device Q1 and resistances R2 and R3. Current flows through resistance R6 and the forward biased diode D1 causing the output transistor T1 to conduct heavily. Current flow in the collector circuit of transistor T1 flows through resistance R8 reducing the voltage at the collector of the output transistor T1. The effect of this reduced voltage on the distributing section 11 will be explained hereinbelow.

Current flow through the switching device Q1 quickly discharges capacitance C1 producing a very low voltage on the anode of switching device Q1 and switching that device to the nonconducting state. Conduction also ceases through transistor T1 and the voltage at its collector rises. The effect of this increased voltage on the distributing section 11 will be explained hereinbelow.

With switching device Q1 in the nonconducting state current flows through resistance R2 to charge the capacitance C1. When the capacitance C1 charges sufficiently so that the junction between the anode and anode gate regions of the switching device Q1 is sufficiently forward biased, the switching device Q1 switches to the conducting state causing output transistor T1 to conduct. Thus, the time between pulses depends on the time constant of the charging network of resistance R2 and capacitance C1 and the level to which the capacitance C1 must be charged to cause switching as determined by the value of the resistance R5 and the variable resistance R4. That is, the greater the value of resistance R4, the higher the frequency of the trigger pulses produced by the oscillator section 10.

The distributing section 11 includes a plurality, four as shown in the FIGURE and discussed herein, of four-layer-type switching devices Q2, Q3, Q4, and Q5 similar to switching device Q1 arranged in succession. The anode of each of the four switching devices is connected directly to the collector of the oscillator section output transistor T1 and thus through resistance R8 to the B+ voltage source. The cathode of each of the four switching devices Q2, Q3, Q4, and Q5 is connected directly to the base of a corresponding NPN transistor T2, T3, T4, and T5, respectively. The collector of each of these transistors is connected through a resistance R9, R12, R15, and R18, respectively, to the B+ voltage source. The cathode gate of the first switching device Q2 is connected to a biasing arrangement including a Zener diode D2 connected to the collector of transistor T1 and a resistance R10 connected to ground.

The anode gate of each of the switching devices except device Q5, the last switching device in the succession, is connected to the cathode gate of the next switching device in succession by a coupling arrangement including a series connection of a resistance, a capacitance, and a resistance connected between the B+ voltage source and ground. The anode gate of switching device Q2 is connected to the juncture between resistance R11 and capacitance C2 and the cathode gate of switching device Q3 is connected to the juncture between capacitance C2 and resistance R13. The anode gate of switching device Q3 is connected to the juncture between resistance R14 and capacitance C3 and the cathode gate of switching device Q4 is connected to the juncture between capacitance C3 and resistance R16. The anode gate of switching device Q4 is connected to the juncture between resistance R17 and capacitance C4 and the cathode gate of switching device Q5 is connected to the juncture between capacitance C4 and resistance R19. The anode gate of switching device Q5, the last device in succession, is connected through a resistance R20 to the B+ voltage source.

The distributing section 11 acts in the following manner in response to negative-going trigger pulses from the oscillator section 10 to produce a continuous sequence of output signals at lines 12, 13, 14, and 15 in succession. When the oscillator section output transistor T1 is conducting, the negative-going pulse at the collector of transistor T1 caused by current flow through resistance R8 lowers the potential at the anodes of the four switching devices Q2, Q3, Q4, and Q5 causing any switching device which is in the conducting state to be switched to the nonconducting state. For purposes of explanation it is assumed that switching device Q5, the last device in succession, was in the conducting state prior to the trigger pulse. Thus, the change of operating state of the switching device has no effect on any other switching device.

As conduction ceases in transistor T1 terminating the trigger pulse, the voltage at the anodes of the switching devices Q2, Q3, Q4, and Q5 increases and the voltage at the cathode gate of the first switching device Q2 also increases. The cathode gates of the other switching device in the distributing section are substantially at ground since there is no current flow in any of the coupling arrangements. When the voltages at the cathode gate of the switching device Q2 is sufficiently high, switching device Q2 is switched to the conducting state driving its corresponding transistor T2 into conduction. Diode D2 is a Zener breakdown diode and serves to prevent noise from inadvertently causing switching device Q2 to be switched to the conducting state.

With transistor T2 conducting, the current flows in its collector circuit through resistance R9 and a negative-going signal is produced on output line 12. Current flow in the anode circuit of switching device Q2 through resistance R8 lowers the voltage at the anodes of all the switching devices sufficiently so that regardless of the subsequent biasing conditions at the gates of any of the other switching devices they cannot be switched to the conducting state.

When switching device Q2 is in the conducting state, current also flows into the device at the anode gate. Thus, capacitance C2 is discharged. Switching device Q2 and its corresponding transistor T2 continue to conduct while the oscillator section output transistor T1 is not conducting. Thus, the reduced voltage signal continues to appear at output line 12.

During the next trigger pulse from the oscillator section 10 conduction in the collector circuit of transistor T1 through resistance R8 reduces the voltage at the anode of switching device Q2 sufficiently to switch that device to the nonconducting state. Conduction ceases through the corresponding transistor T2 and the voltage at the output line 12 returns to a relatively high level. As conduction ceases through switching device Q2 and the trigger pulse terminates, capacitance C2 charges through the series connection of resistance R11, capacitance C2, and resistance R13. The charging current causes the voltage at the cathode gate of the next switching device in succession, Q3 to increase. Switching device Q3 is thus biased so as to permit switching to the conducting state.

Upon termination of the trigger pulse as the voltage at the collector of transistor T1 rises, the second switching device Q3 switches to the conducting state. The bias voltage produced at the cathode gate of the second switching device Q3 rises faster than that at the cathode gate of the first switching device Q2 so that the second switching device Q3 switches to the conducting state first. Once switching device Q3 is in the conducting state, the voltage drop across resistance R8 prevents any of the other switching devices in the succession, including the first switching device Q2, from becoming conductive.

When the second switching device Q3 is in the conducting state, its corresponding transistor T3 is also conducting producing a negative-going signal at the output line 13. Current also flows into the anode gate discharging capacitance C3. Thus, the next trigger pulse causes switching device Q3 and its corresponding transistor T3 to be switched to the conducting state and the third switching device Q4 and its corresponding transistor T4 to be switched to the conducting state producing a low-voltage signal at the output line 14. Similarly, the next trigger pulse causes switching device Q4 and its corresponding transistor T4 to be switched to the nonconducting state and the fourth switching device Q5 and its corresponding transistor T5 to be switched to the conducting state producing a low-voltage signal at the output line 15.

When the switched device Q5, which is the last in succession, is in the conducting state, current flows into the anode gate through resistance R20. However, there is no coupling arrangement between switching device Q5 and any of the other switching devices. Therefore, during the trailing edge of the next trigger pulse the first switching device Q2 is switched to the conducting state as explained hereinabove, starting the next cycle of operation. Thus, the distributing section 11 operates in response to the series of trigger pulses from the oscillator section 10 to produce a continuous sequence of negative-going output pulses at the output lines 12, 13, 14, and 15, in succession.

The pulses on the output lines 12, 13, 14, and 15 of the distributing section 11 are coupled to the driving section 17 through the amplifying and inverting section 16. The output lines 12, 13, 14, and 15 are coupled to the bases of four NPN transistors T6, T8, T7, and T9, respectively, of the amplifying and inverting section 16. A positive-going pulse is thus produced at the collector of each of these transistors in response to a negative-going pulse at the respective output line from the distributing section 11.

The driving section 17 includes four NPN driving transistors T10, T12, T11, and T13 which have their bases coupled to the collectors of transistors T6, T8, T7, and T9, respectively, of the amplifying and inverting section 16. The driving section 17 also includes two transformers 18 and 19 which have center-tapped primary windings. The first and third driving transistors T10 and T11 have their collectors connected to opposite ends of the center-tapped primary winding of the first transformer 18. The second and fourth driving transistors T12 and T13 have their collectors connected to opposite ends of the center-tapped primary winding of the second transformer 19. A variable, DC positive voltage source 27 is connected to the center-taps of the two transformers.

It can be seen that when an output signal is produced at the output line 12, the driving transistor T10 is in conduction. Similarly, output signals at output lines 13, 14, and 15 cause driving transistors T12, T11, and T13, respectively, to conduct. Thus, the pulses produced at the first and third output lines 12 and 14 of the distributing section 11 cause a first set of alternating signals to be produced across the secondary winding of the first transformer 18, and the pulses produced at the second and fourth output lines 13 and 15 cause a second set of alternating signals to be produced across the secondary winding of the second transformer 19.

One end of the secondary winding of each transformer is connected to a common output connection. The other ends of the two secondary windings are connected to separate output connections from the driving section.

Thus, the apparatus as shown provides two-phase output at a 90° phase angle. The output voltage and the frequency can be varied by varying the voltage of the DC voltage source 27 and the resistance R4, respectively.

As illustrated in the FIGURE the output connections from the driving section are connected to a two-phase synchronous electrical motor 25 through a reversing switch 26. The setting of the reversing switch 26 determines which of the two sets of alternating signals is applied across each of the two sets of motor windings and thus controls the direction of the rotation of the motor.

The two-phase synchronous electrical motor 25 may be operated at various speeds by control of the output voltage and frequency of the apparatus. The amplitude of the output voltage is varied when the frequency is varied so that proper inductive current flows through the motor windings. With proper current flow through the windings the motor produces adequate driving torque.

In one specific embodiment of a motor driving circuit in accordance with the invention components as listed below were employed.

Q1, Q2, Q3, Q4, and Q5—RCA type 4047 silicon-controlled switch

T1, T2, T3, T4, T5, T6, T7, T8 and T9—Sylvania type 4444 transistor

T10, T11, T12, and T13—Type 2N376 transistor

D1, 1N2069
D2, 1N753 Zener Diode
R1, 10 megahertz
R2, 3300 ohms
R3, 150 ohms
R4, 15 kilohms potentiometer
R5, 15 kilohms
R6, 2 kilohms
R7, 1 kilohms
R8, 2400 ohms
R9, 1 kilohm
R10, 10 kilohms
R11, 22 kilohms
R12, 1 kilohm
R13, 10 kilohms
R14, 22 kilohms
R15, 1 kilohm
R16, 10 kilohms
R17, 22 kilohms
R18, 1 kilohm
R19, 10 kilohms
R20, 22 kilohms
R21, 1 kilohm
R22, 200 ohms
R23, 200 ohms
R24, 1 kilohm
R25, 1 kilohm
R26, 200 ohms
R27, 200 ohms
R28, 1 kilohm
R29, 10 ohms
R30, 10 ohms
R31, 10 ohms
R32, 10 ohms
C1, .1 microfarad
C2, .001 microfarad
C3, .001 microfarad
C4, .001 microfarad B+—+20 volts The transformers were each a Chicago/Stancor filament transformer No. P8180.

The circuitry was employed to drive a model PC-DA synchronous motor manufactured by the Hurst Mfg. Corp. Princeton, Ind. and designed to rotate its output shaft at a speed of 1 revolution per minute with applied power of 60 cycles per second. The value of resistance R4 was set to produce an output frequency of 240 cycles per second. For this frequency the voltage applied to the center-tap of the transformers by the voltage source 27 was adjusted to 40-volts DC. The value of resistance R4 was also adjusted to produce an output frequency of 60 cycles per second with the voltage of the voltage source 27 at 20 volts DC.

While there has been shown and described what is considered a preferred embodiment of the present invention, it will be obvious to those skilled in the art that various changes and modifications may be made therein without departing from the invention as defined by the appended claims.

I claim:

1. Pulse-generating apparatus including in combination:

a source of trigger pulses for producing a series of trigger pulses;

a plurality of switching devices arranged in succession, each having an anode terminal, a cathode terminal, a gate electrode adjacent the anode terminal, and a gate electrode adjacent the cathode terminal;

said switching devices being operable in a conducting state and in a nonconducting state;

a source or reference potential connected through a common resistance means to one of said terminals of each of the switching devices of the plurality;

said source of reference potential being capable of switching to the conducting state a switching device biased so as to permit switching to the conducting state and being capable of sustaining operation of a switching device in the conducting state;

said resistance means being operable to permit only one switching device to operate in the conducting state at a time;

said source of trigger pulses being connected to the one of said terminals of each of the switching devices and being operable to switch all the switching devices to the nonconducting state during a trigger pulse;

a like plurality of transistors arranged in succession, each transistor corresponding to a switching device;

each of said transistors having an input electrode and an output electrode and operable to produce an output signal at the output electrode when the transistor is conducting;

the other of said terminals of each of the switching devices of the plurality being connected to the input electrode of a corresponding transistor;

a transistor being biased to conduction when the corresponding switching device connected to its input electrode is in the conducting state;

coupling means connecting the gate electrode adjacent the one terminal of each of the switching devices except the last switching device in succession to the gate electrode adjacent the other terminal of the switching device next in succession;

said coupling means being operable in response to switching of the preceding switching device from the conducting state to the nonconducting state to bias a switching device so as to permit switching of the switching device to the conducting state;

biasing means connected to the source of trigger pulses and to the gate electrode adjacent the other of said terminals of the first switching device in succession and operable to bias said first switching device so as to permit switching of the first switching device to the conducting state upon termination of the trigger pulse when none of the other switching devices is biased to permit switching to the conducting state;

whereby each switching device in succession operates in the conducting state thereby causing the transistors to conduct in succession and produce a continuous series of output signals at the output electrodes.

2. Pulse-generating apparatus according to claim 1 including:
   a second source of reference potential;
   the emitter of each transistor of the plurality being connected directly to said second source of reference potential;
   the base of each transistor of the plurality being connected directly to the other of said terminals of the corresponding switching device; and
   the collector of each transistor of the plurality being connected through a separate resistance to the first-mentioned source of reference potential.

3. Pulse-generating apparatus according to claim 2 wherein said coupling means includes:
   series connections of a first resistance, a capacitance, and a second resistance connected between the first-mentioned and second sources of reference potential, each series connection corresponding to a switching device of the plurality of switching devices except the last switching device in succession;
   the juncture between the first resistance and the capacitance of each series connection being connected directly to the gate electrode adjacent the one of said terminals of the corresponding switching device, and the juncture between the capacitance and the second resistance of each series connection being connected directly to the gate electrode adjacent the other of said terminals of the switching device next in succession to the corresponding switching device;
   the gate electrode adjacent the one of said terminals of the last switching device in succession being connected through a resistance to the first-mentioned source of reference potential;
   whereby when a switching device of the plurality other than the last switching device in succession is in the conducting state, conduction through the corresponding first resistance reduces the potential at the gate electrode adjacent the one of said terminals as the corresponding capacitance discharges; and when the switching device is switched to the nonconducting state during a trigger pulse, conduction through the series connection biases the next switching device in succession so as to permit switching of that switching device to the conducting state upon termination of the trigger pulse.

4. Pulse-generating apparatus according to claim 2 wherein the source of trigger pulses includes:
   a switching device having an anode terminal, a cathode terminal, a gate electrode adjacent the anode terminal, and a gate electrode adjacent the cathode terminal;
   said switching device being operable in a conducting state and in a nonconducting state;
   one of said terminals of the switching device being connected through a resistance to the first-mentioned source of reference potential;
   the other of said terminals of the switching device being connected through a resistance to the second source of reference potential;
   a voltage divider connected between the first-mentioned and the second sources of reference potential and to the gate electrode adjacent the one of said terminals of the switching device and operable to produce a potential intermediate that of the first-mentioned and second sources of reference potential at the gate electrode adjacent the one of said terminals;
   a capacitance connected between the one of said terminals of the switching device and the second source of reference potential;
   said switching device being switched to the conducting state when the potential at the one of said terminals exceeds the potential at the gate electrode adjacent the one of said terminals by a predetermined amount, and being switched to the nonconducting state when the potential at the one of said terminals is reduced to a predetermined level;

whereby when the switching device is in the conducting state, conduction through the resistance connected between the one of said terminals of the switching device and the first-mentioned source of reference potential reduces the potential at the one of said terminals as the capacitance discharges thereby switching the switching device to the nonconducting state when potential at the one of said terminals is reduced to said predetermined level; and whereby when the switching device is in the nonconducting state, the capacitance charges through the resistance between the one of said terminals and the first-mentioned source of reference potential thereby switching the switching device to the conducting state when the potential at the one of said terminals exceeds the potential at the gate electrode adjacent the one of said terminals by said predetermined amount.

5. Pulse-generating apparatus according to claim 4 wherein the source of trigger pulses also includes:
   a transistor having its base coupled to the other of said terminals of the switching device in the source of trigger pulses, its emitter connected directly to the second source of reference potential, and its collector connected directly to the one of said terminals of each of the switching devices of the plurality;
   said transistor having biased to conduction when the switching device in the source of trigger pulses is in the conducting state thereby producing a trigger pulse and reducing the potential at the one of said terminals of each of the switching devices of the plurality and switching the switching devices to the nonconducting state.

6. Pulse-generating apparatus according to claim 5 wherein said coupling means includes:
   series connections of a first resistance, a capacitance, and a second resistance connected between the first-mentioned and second sources of reference potential, each series connection corresponding to a switching device of the plurality of switching devices except the last switching device in succession;
   the juncture between the first resistance and the capacitance of each series connection being connected directly to the gate electrode adjacent the one of said terminals of the corresponding switching device, and the juncture between the capacitance and the second resistance of each series connection being connected directly to the gate electrode adjacent the other of said terminals of the switching device next in succession to the corresponding switching device;
   the gate electrode adjacent the one of said terminals of the last switching device in succession being connected through a resistance to the first-mentioned source of reference potential;
   whereby when a switching device of the plurality other than the last switching device in succession is in the conducting state, conduction through the corresponding first resistance reduces the potential at the gate electrode adjacent the one of the said terminals as the corresponding capacitance discharges; and when the switching device is switched to the nonconducting state during a trigger pulse, conduction through the series connection produces a potential at the gate electrode adjacent the other of said terminals of the next switching device in succession so as to permit switching of that switching device to the conducting state upon termination of the trigger pulse; and said biasing means includes:
  impedance means connected between the collector of the transistor in the source of trigger pulses and the second source of reference potential;
  the gate electrode adjacent the other of said terminals of the first switching device in succession being connected to said impedance means;
  said impedance means being operable upon termination of a trigger pulse to produce a potential at the gate electrode adjacent the other of said terminals of the first switching device in succession so as to permit switching of that switching device to the conducting state upon termination of the trigger pulse;
  the potential produced at the gate electrode adjacent the other of said terminals of the first switching device in succession being less than the potential produced at the gate electrode adjacent the other of said terminals of the next switching device in succession when a switching device is switched to the nonconducting state;
whereby the first switching device in succession is switched to the conducting state upon termination of a trigger pulse only when the last switching device in succession has been switched from the conducting state to the nonconducting state during that trigger pulse.

7. Apparatus in accordance with claim 6 wherein:
said plurality of switching devices includes four switching devices in succession and said plurality of transistors includes four transistors in succession; whereby output signals are produced at the collectors of each of the four transistors in sequence; and further including:
  four driving transistor circuit means each including a driving transistor;
  the emitters of the four driving transistors being connected together;
  the collector of the first transistor of the plurality of transistors being coupled to the base of the first driving transistor;
  the collector of the second transistor of the plurality of transistors being coupled to the base of the second driving transistor;
  the collector of the third transistor of the plurality of transistors being coupled to the base of the third driving transistor;
  the collector of the fourth transistor of the plurality of transistors being coupled to the base of the fourth driving transistor;
  a first transformer having a center-tapped primary winding and a secondary winding;
  a second transformer having a center-tapped primary winding and a secondary winding;
  a source of reference potential connected to the center-taps of the first and second transformers;
  the collector of the first driving transistor being connected to one end of the primary winding of the first transformer;
  the collector of the third driving transistor being connected to the other end of the primary winding of the first transformer;
  the collector of the second driving transistor being connected to one end of the primary winding of the second transformer; and
  the collector of the fourth driving transistor being connected to the other end of the primary winding of the second transformer;
whereby alternating signals of different phase are produced across the secondary windings of the transformers.